US006873330B2

(12) United States Patent
Burk et al.

(10) Patent No.: US 6,873,330 B2
(45) Date of Patent: Mar. 29, 2005

(54) SYSTEM AND METHOD FOR PERFORMING PREDICTABLE SIGNATURE ANALYSIS

(75) Inventors: Wayne Eric Burk, San Jose, CA (US); David Gibbs, Oxnard, CA (US); David Kehlet, Los Altos, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 231 days.

(21) Appl. No.: 10/090,490

(22) Filed: Mar. 4, 2002

(65) Prior Publication Data

US 2003/0164835 A1 Sep. 4, 2003

(51) Int. Cl.[7] .............................................. G06F 15/16
(52) U.S. Cl. ..................... 345/503; 714/732; 714/733
(58) Field of Search ......................... 345/503; 714/715, 714/726, 732–734

(56) References Cited

U.S. PATENT DOCUMENTS

| | | | | |
|---|---|---|---|---|
| 4,929,889 A | * | 5/1990 | Seiler et al. ................ | 714/731 |
| 5,153,886 A | * | 10/1992 | Tuttle ........................ | 714/819 |
| 5,862,150 A | | 1/1999 | Lavelle et al. | |
| 6,510,398 B1 | * | 1/2003 | Kundu et al. ............... | 702/117 |
| 6,625,688 B1 | * | 9/2003 | Fruehling et al. .......... | 711/109 |
| 6,651,196 B1 | * | 11/2003 | Iwase et al. ................ | 714/724 |

* cited by examiner

*Primary Examiner*—Matthew C. Bella
*Assistant Examiner*—Mackly Monestime
(74) *Attorney, Agent, or Firm*—Meyertons Hood Kivlin Kowert & Goetzel, P.C.; Jeffrey C. Hood

(57) ABSTRACT

In one embodiment, a computer system includes a first component configured to output data on a bus in response to a request for data from a second component. The data output by the first component may include both the requested data and unrequested data, and the unrequested data may have an unpredictable value. A controller coupled to the bus may be configured to replace the unrequested data with data that has a predictable value. A signature analysis register included in the second component is configured to capture the requested data and the predictable data output by the controller. Thus, the signature captured in the second component may be predictable, despite the unpredictable data output by the first component.

26 Claims, 10 Drawing Sheets

SYSTEM AND METHOD FOR PERFORMING PREDICTABLE SIGNATURE ANALYSIS

BACKGROUND OF THE INVENTION

1. Field of the Invention

This invention relates to signature analysis and, more particularly, to signature analysis within graphics systems.

2. Description of the Related Art

Signature analysis is a method of hardware testing. It involves calculating the signature of a set of data according to a particular algorithm, usually after this data has passed through some hardware under test. By comparing the actual signature with a signature that is known to be correct (a "golden" signature), a pass/fail determination of the hardware under test can be made.

Signature analysis may involve creating several signature registers throughout a particular system. As data and control signals flow past each signature register, the data and control signals may be captured and combined with the signature in the signature register by applying the signature algorithm. The golden signature used to verify the signatures in the signature registers may be determined through simulation or through performing a test with a particular set of test data on a system that is known to be operating correctly.

Problems may arise during signature analysis if the data and control signals that flow past each signature register are not predictable. Since each data and control signal value may affect the signature in the signature register, unpredictable values may cause unpredictable signatures. Unpredictable signatures do not provide a useful diagnosis of the hardware under test since they may produce an incorrect signature (i.e., a signature that doesn't match the golden signature) even if the system is actually working correctly. Thus, it is desirable to be able to capture predictable signatures in systems where unpredictable data may flow past signature registers.

SUMMARY

Various embodiments of a system and method for performing predictable signature analysis are disclosed. In one embodiment, a computer system includes a first component configured to output data on a bus in response to a request for data from a second component. The data output by the first component may include both the requested data and unrequested data, and the unrequested data may have an unpredictable value. A controller coupled to the bus may be configured to replace the unrequested data with data that has a predictable value. A signature analysis register included in the second component is configured to capture the requested data and the predictable data output by the controller. Thus, the signature captured in the second component may be predictable, despite the unpredictable data output by the first component.

BRIEF DESCRIPTION OF THE DRAWINGS

A better understanding of the present invention can be obtained when the following detailed description is considered in conjunction with the following drawings, in which.

Figure 1:
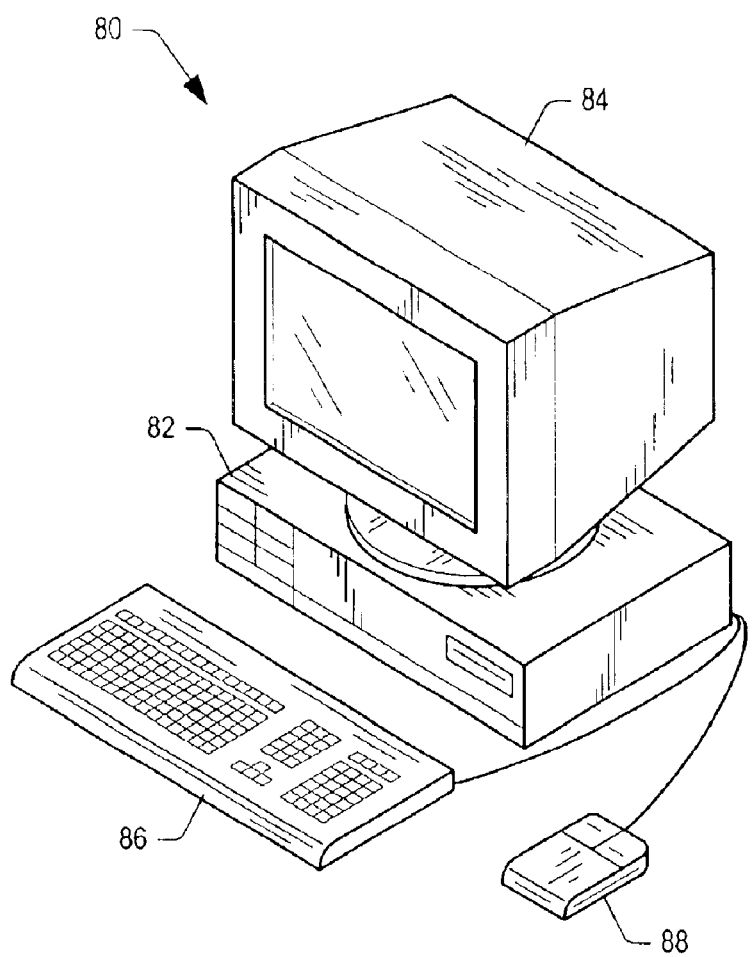
FIG. 1 is a perspective view of one embodiment of a computer system.

While the invention admits various modifications and alternative forms, specific embodiments thereof are shown by way of example in the drawings and will herein be described in detail. It should be understood, however, that the drawings and detailed description thereto are not intended to limit the invention to the particular form (or forms) disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include," and derivations thereof, mean "including, but not limited to". The term "connected" means "directly or indirectly connected," and the term "coupled" means "directly or indirectly coupled."

DETAILED DESCRIPTION OF EMBODIMENTS

Computer System—FIG. 1

FIG. 1 illustrates one embodiment of a computer system 80 that includes a graphics system. The graphics system may be included in any of various systems such as computer systems, network PCs, Internet appliances, televisions (e.g., HDTV systems and interactive television systems), personal digital assistants (PDAs), virtual reality systems, and other devices that display 2D and/or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
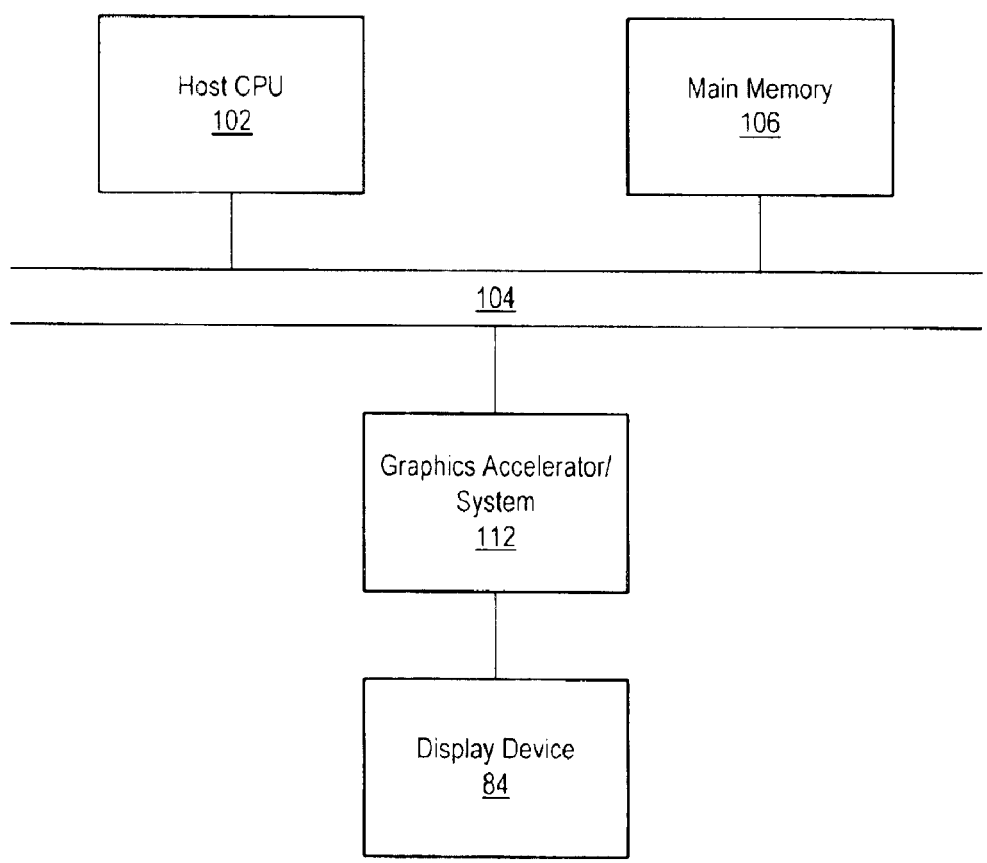
FIG. 2 is a simplified block diagram of one embodiment of a computer system.

Computer System Block Diagram—FIG. 2

FIG. 2 is a simplified block diagram illustrating the computer system of FIG. 1. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may include one or more processors of varying types, e.g., microprocessors, multi-processors and CPUs. The system memory 106 may include any combination of different types of memory subsystems such as random access memories (e.g., static random access memories or "SRAMs," synchronous dynamic random access memories or "SDRAMs," and Rambus dynamic random access memories or "RDRAMs," among others), read-only memories, and mass storage devices. The system bus or host bus 104 may include one or more communication or host computer buses (for communication between host processors, CPUs, and memory subsystems) as well as specialized subsystem buses.

In FIG. 2, a graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the figure, one or more display devices 84 may be connected to the graphics system 112.

Host CPU 102 may transfer information to and from the graphics system 112 according to a programmed input/output (I/O) protocol over host bus 104. Alternately, graphics system 112 may access system memory 106 according to a direct memory access (DMA) protocol or through intelligent bus mastering.

A graphics application program conforming to an application programming interface (API) such as OpenGL® or Java 3D™ may execute on host CPU 102 and generate commands and graphics data that define geometric primitives such as polygons for output on display device 84. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g., the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by elements of the illustrated graphics system 112 may be implemented in software.

Figure 3:
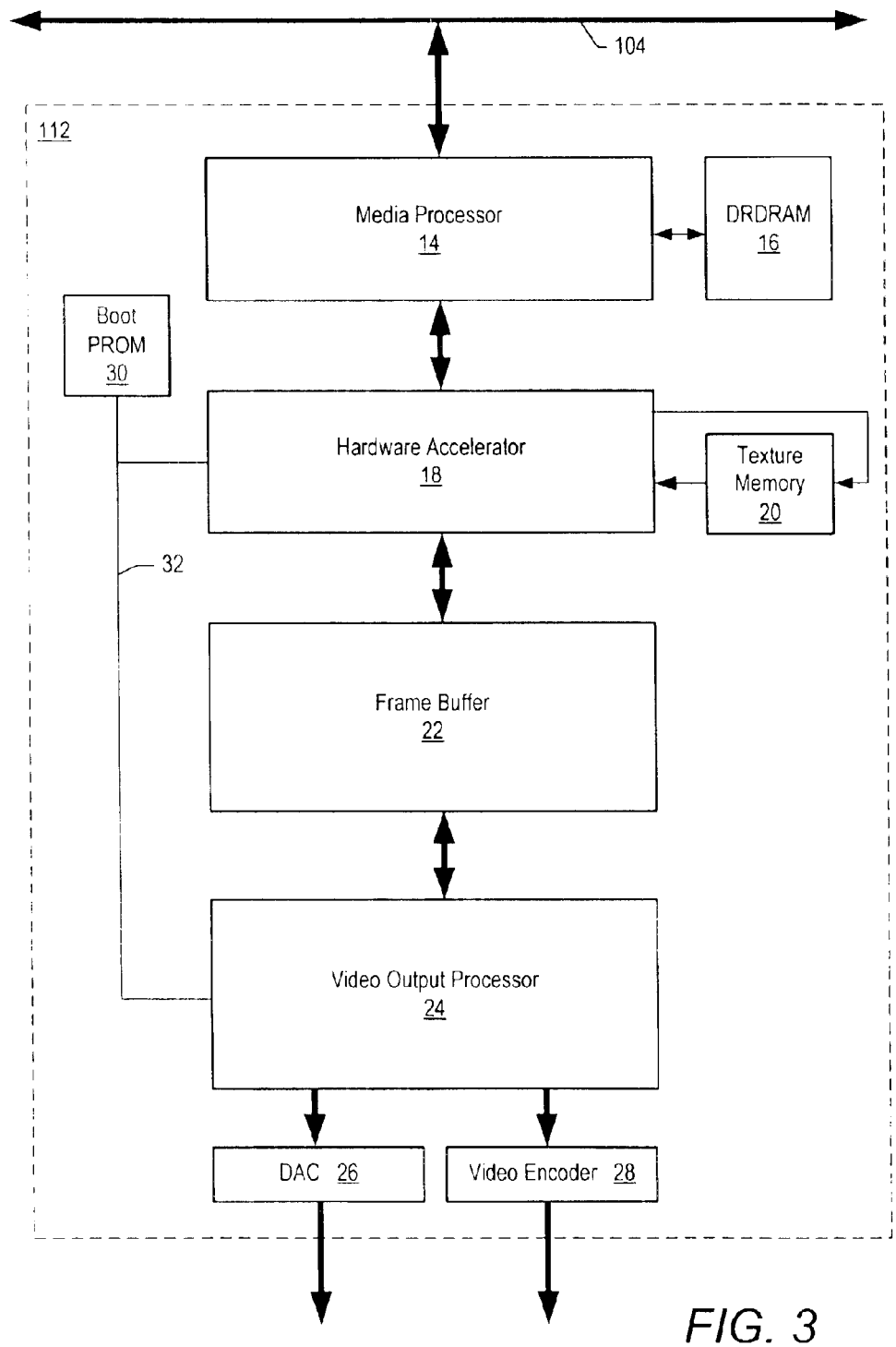
FIG. 3 is a functional block diagram of one embodiment of a graphics system.

Graphics System—FIG. 3

FIG. 3 is a functional block diagram illustrating one embodiment of graphics system 112. Note that many other embodiments of graphics system 112 are possible and contemplated. Graphics system 112 may include one or more media processors 14, one or more hardware accelerators 18, one or more texture buffers 20, one or more frame buffers 22, and one or more video output processors 24. Graphics system 112 may also include one or more output devices such as digital-to-analog converters (DACs) 26, video encoders 28, flat-panel-display drivers (not shown), and/or video projectors (not shown). Media processor 14 and/or hardware accelerator 18 may include any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality incorporated in either or both of the media processor or the hardware accelerator may be implemented in software.

In one set of embodiments, media processor 14 is one integrated circuit and hardware accelerator is another integrated circuit. In other embodiments, media processor 14 and hardware accelerator 18 may be incorporated within the same integrated circuit. In some embodiments, portions of media processor 14 and/or hardware accelerator 18 may be included in separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
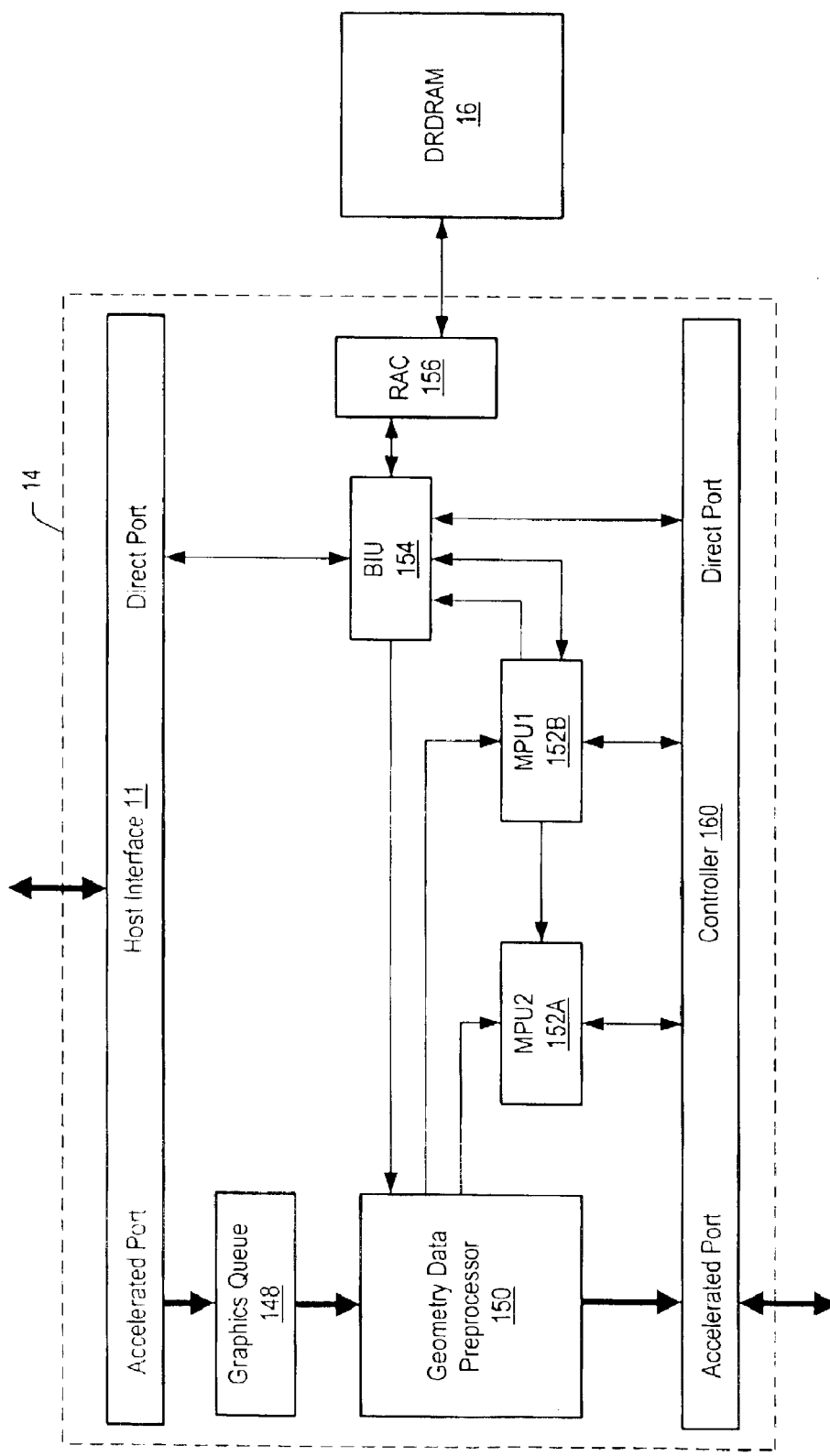
FIG. 4 is a functional block diagram of one embodiment of the media processor of FIG. 3.

Media Processor—FIG. 4

FIG. 4 shows one embodiment of media processor 14. As shown, media processor 14 may operate as the interface between graphics system 112 and computer system 80 by controlling the transfer of data between computer system 80 and graphics system 112. In some embodiments, media processor 14 may also be configured to perform transformations, lighting, and/or other general-purpose processing operations on graphics data.

Transformation refers to the spatial manipulation of objects (or portions of objects) and includes translation, scaling (e.g., stretching or shrinking), rotation, reflection, or combinations thereof. More generally, transformation may include linear mappings (e.g., matrix multiplications), non-linear mappings, and combinations thereof.

Lighting refers to calculating the illumination of the objects within the displayed image to determine what color values and/or brightness values each individual object will have. Depending upon the shading algorithm being used (e.g., constant, Gourand, or Phong), lighting may be evaluated at a number of different spatial locations.

As illustrated, media processor 14 may be configured to receive graphics data via host interface 11. A graphics queue 148 may be included in media processor 14 to buffer a stream of data received via the accelerated port of host interface 11. The received graphics data may include one or more graphics primitives. As used herein, the term graphics primitive may include polygons, parametric surfaces, splines, NURBS (non-uniform rational B-splines), subdivisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transformation, lighting calculations and other programmable functions, and to send the results to hardware accelerator 18. MPUs 152 may also have read/write access to texels (i.e., the smallest addressable unit of a texture map) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to one or more memories. For example, as shown, media processor 14 may include direct Rambus interface 156 to a direct Rambus DRAM (DRDRAM) 16. A memory such as DRDRAM 16 may be used for program and/or data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface such as bus interface unit (BIU) 154. Bus interface unit 154 provides a path to memory 16 and a path to hardware accelerator 18 and video output processor 24 via controller 160.

Figure 5:
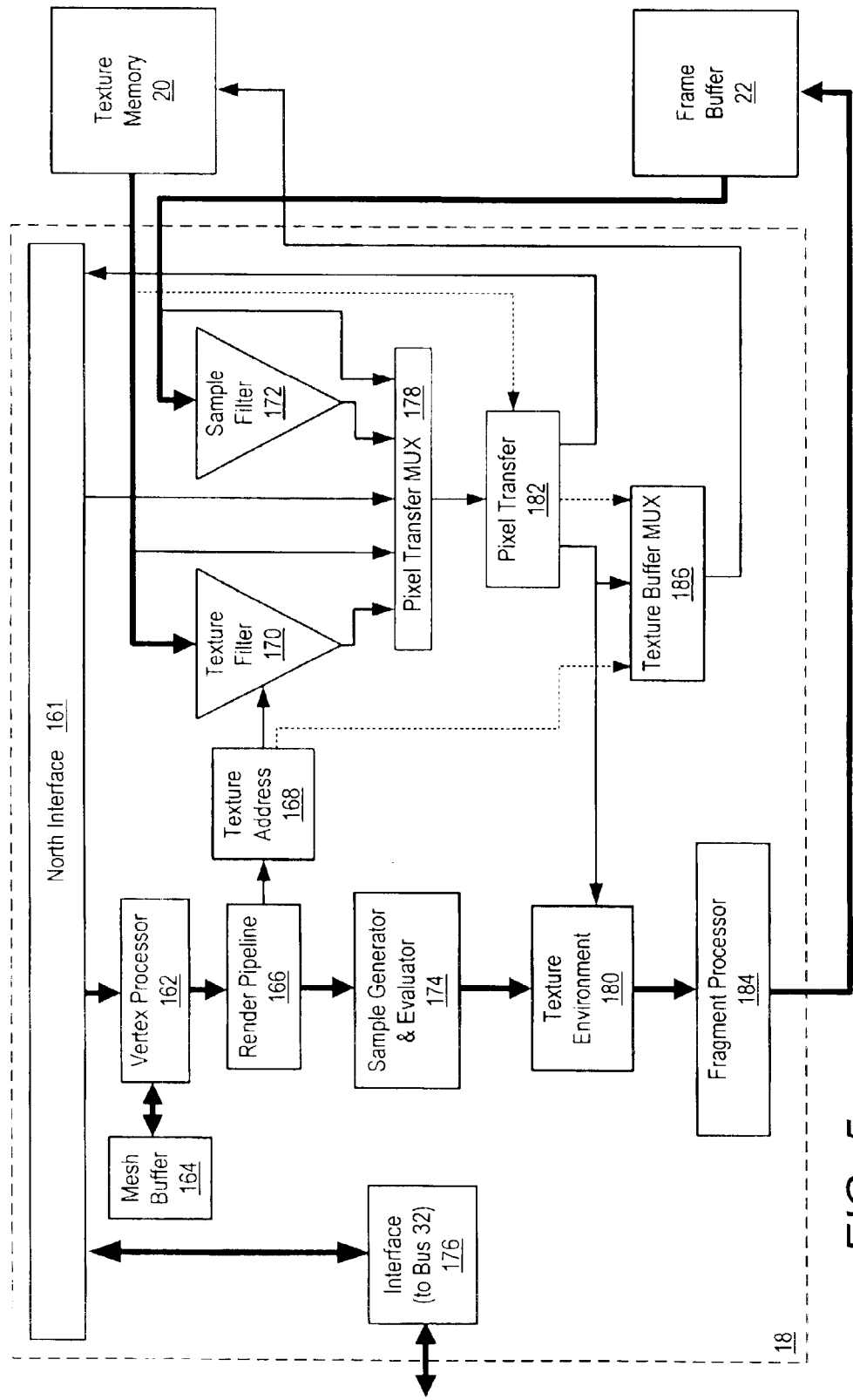
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and to perform a number of functions on the received data according to the received instructions. For example, hardware accelerator 18 may be configured to perform rasterization, 2D and/or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window, a viewpoint located in world space, a front clipping plane and a back clipping plane. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to generate the data used to form each pixel that will be displayed. For example, hardware accelerator 18 may calculate "samples." Samples are points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may receive commands and/or data from media processor 14 through interface 161. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to rasterize 2D window system primitives and 3D primitives into fragments. A fragment may contain one or more samples. Each sample may contain a vector of color data and perhaps other data such as alpha and control tags. 2D primitives include objects such as dots, fonts, Bresenham lines and 2D polygons. 3D primitives include objects such as smooth and large dots, smooth and wide DDA (Digital Differential Analyzer) lines and 3D polygons (e.g. 3D triangles).

For example, the render pipeline 166 may be configured to receive vertices defining a triangle, to identify fragments that intersect the triangle.

The render pipeline 166 may be configured to handle full-screen size primitives, to calculate plane and edge slopes, and to interpolate data (such as color) down to tile resolution (or fragment resolution) using interpolants or components such as:

r, g, b (i.e., red, green, and blue vertex color);

r2, g2, b2 (i.e., red, green, and blue specular color from lit textures);

alpha (i.e., transparency);

z (i.e., depth); and s, t, r, and w (i.e., texture components).

In embodiments using supersampling, the sample generator 174 may be configured to generate samples from the fragments output by the render pipeline 166 and to determine which samples are inside the rasterization edge. Sample positions may be defined by user-loadable tables to enable stochastic sample-positioning patterns.

Hardware accelerator 18 may be configured to write textured fragments from 3D primitives to frame buffer 22. The render pipeline 166 may send pixel tiles defining r, s, t and w to the texture address unit 168. The texture address unit 168 may use the r, s, t and w texture coordinates to compute texel addresses (e.g., addresses for a set of neighboring texels) and to determine interpolation coefficients for the texture filter 170. The texel addresses are used to access texture data (i.e., texels) from texture buffer 20. The texture buffer 20 may be interleaved to obtain as many neighboring texels as possible in each clock. The texture filter 170 may perform bilinear, trilinear or quadlinear interpolation. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of (and operations performed on) the processed data, the pixel transfer unit 182 may output the processed data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may also scale and bias and/or lookup texels. The pixel transfer unit 182 may then output data to either the texture buffer 20 or the frame buffer 22.

Fragment processor 184 may be used to perform standard fragment processing operations such as the OpenGL® fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

In one embodiment, texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple memory devices such as 3D-RAM memory devices manufactured by Mitsubishi Electric Corporation. Frame buffer 22 may be configured as a display pixel buffer, an offscreen pixel buffer, and/or a super-sample buffer. Furthermore, in one embodiment, certain portions of frame buffer 22 may be used as a display pixel buffer, while other portions may be used as an offscreen pixel buffer and sample buffer.

Figure 6:
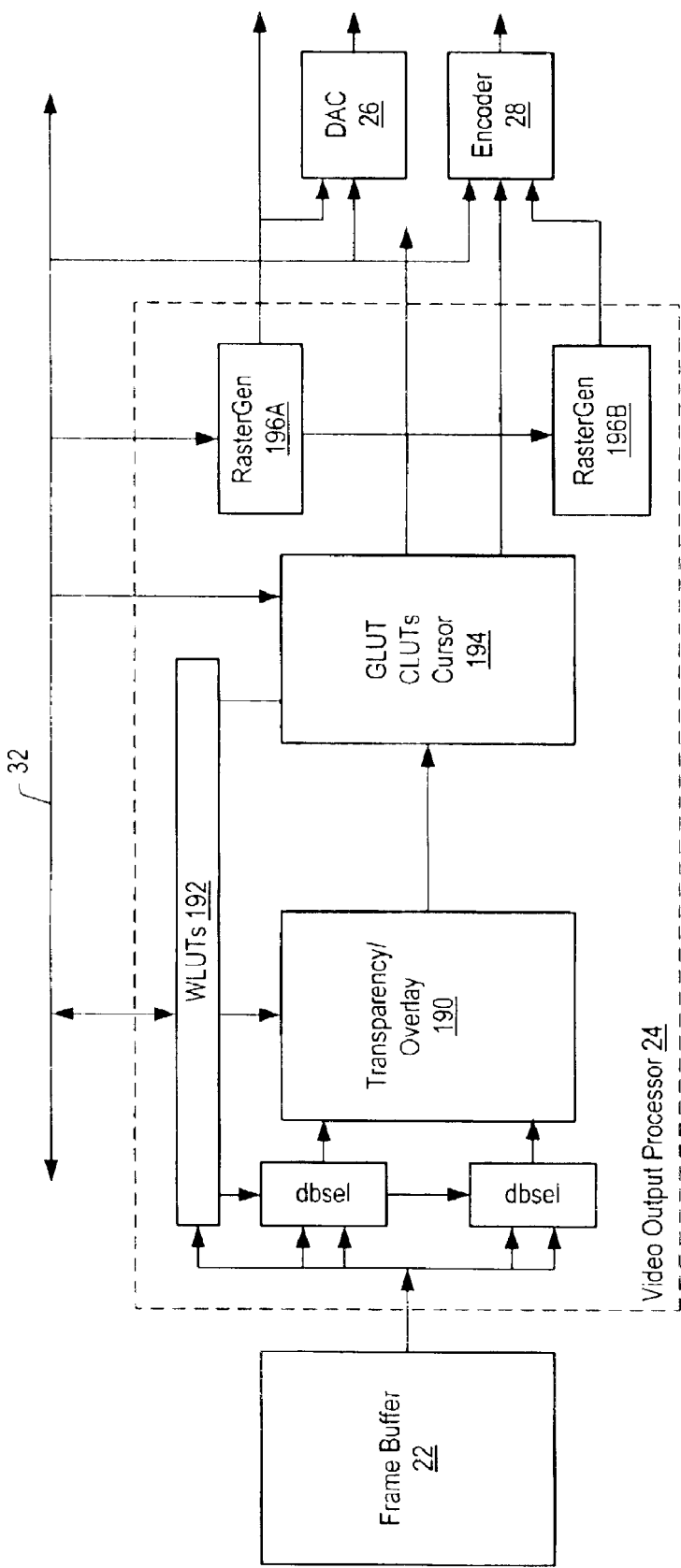
FIG. 6 is a functional block diagram of one embodiment of the video output processor of FIG. 3.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 26 may operate as the final output stage of graphics system 112. The DAC 26 translates the digital pixel data received from GLUT/CLUTs/Cursor unit 194 into analog video signals that are then sent to a display device. In one embodiment, DAC 26 may be bypassed or omitted completely in order to output digital pixel data in lieu of analog video signals. This may be useful when a display device is based on a digital technology (e.g., an LCD-type display or a digital micro-mirror display).

DAC 26 may be a red-green-blue digital-to-analog converter configured to provide an analog video output to a display device such as a cathode ray tube (CRT) monitor. In one embodiment, DAC 26 may be configured to provide a high resolution RGB analog video output at dot rates of 240 MHz. Similarly, encoder 28 may be configured to supply an encoded video signal to a display. For example, encoder 28 may provide encoded NTSC or PAL video to an S-Video or composite video television monitor or recording device.

In other embodiments, the video output processor 24 may output pixel data to other combinations of displays. For example, by outputting pixel data to two DACs 26 (instead of one DAC 26 and one encoder 28), video output processor 24 may drive two CRTs. Alternately, by using two encoders 28, video output processor 24 may supply appropriate video input to two television monitors. Generally, many different combinations of display devices may be supported by supplying the proper output device and/or converter for that display device.

Figure 7:
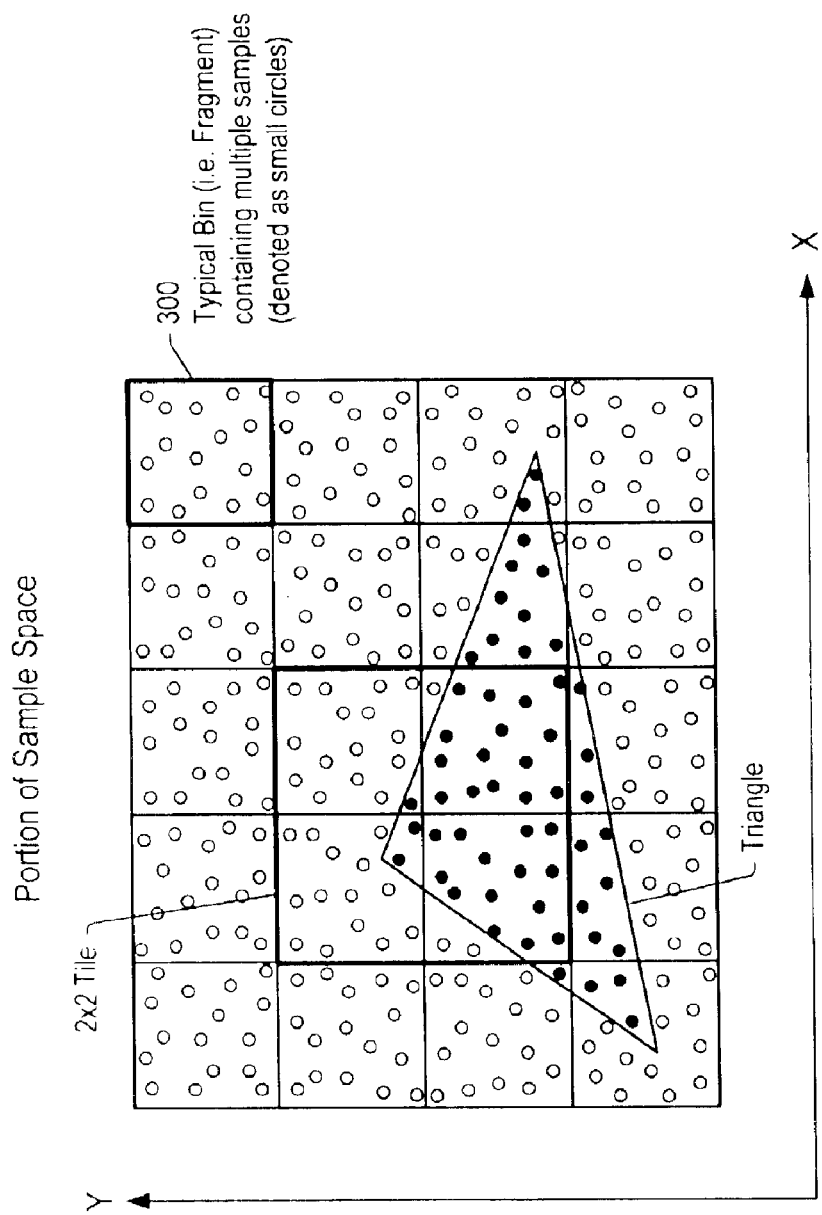
FIG. 7 shows how samples may be organized into bins in one embodiment.

Sample-to-Pixel Processing Flow—FIG. 7

In one set of embodiments, hardware accelerator 18 may receive geometric parameters defining primitives such as triangles from media processor 14, and render the primitives in terms of samples. The samples may be stored in a sample storage area (also referred to as the sample buffer) of frame buffer 22. The samples are then read from the sample storage area of frame buffer 22 and filtered by sample filter 22 to generate pixels. The pixels are stored in a pixel storage area of frame buffer 22. The pixel storage area may be double-buffered. Video output processor 24 reads the pixels from the pixel storage area of frame buffer 22 and generates a video stream from the pixels. The video stream may be provided to one or more display devices (e.g., monitors, projectors, head-mounted displays, and so forth) through DAC 26 and/or video encoder 28.

The samples are computed at positions in a two-dimensional sample space (also referred to as rendering space). The sample space may be partitioned into an array of bins (also referred to herein as fragments). The storage of samples in the sample storage area of frame buffer 22 may be organized according to bins (e.g., bin 300) as illustrated in FIG. 7. Each bin may contain one or more samples. The number of samples per bin may be a programmable parameter.

Figure 8:
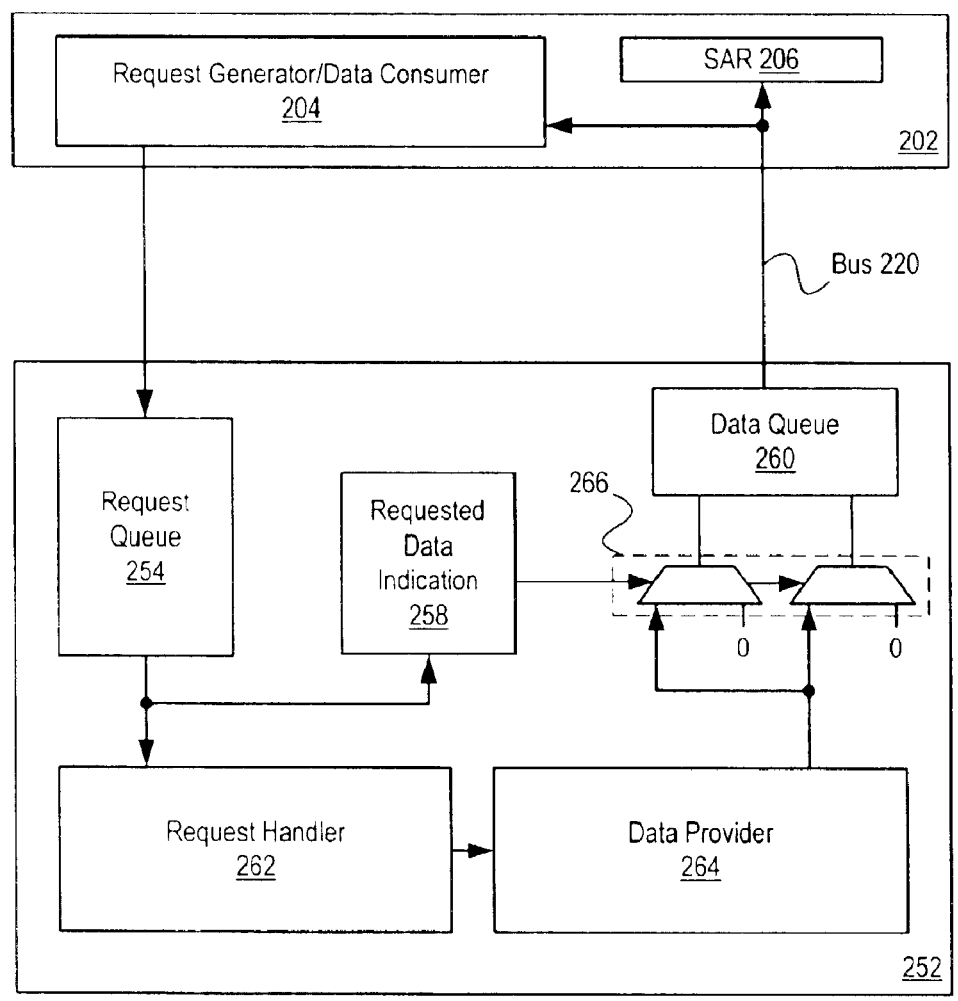
FIG. 8 shows a block diagram of one embodiment of a graphics system that includes a signature analysis register.
Figure 9:
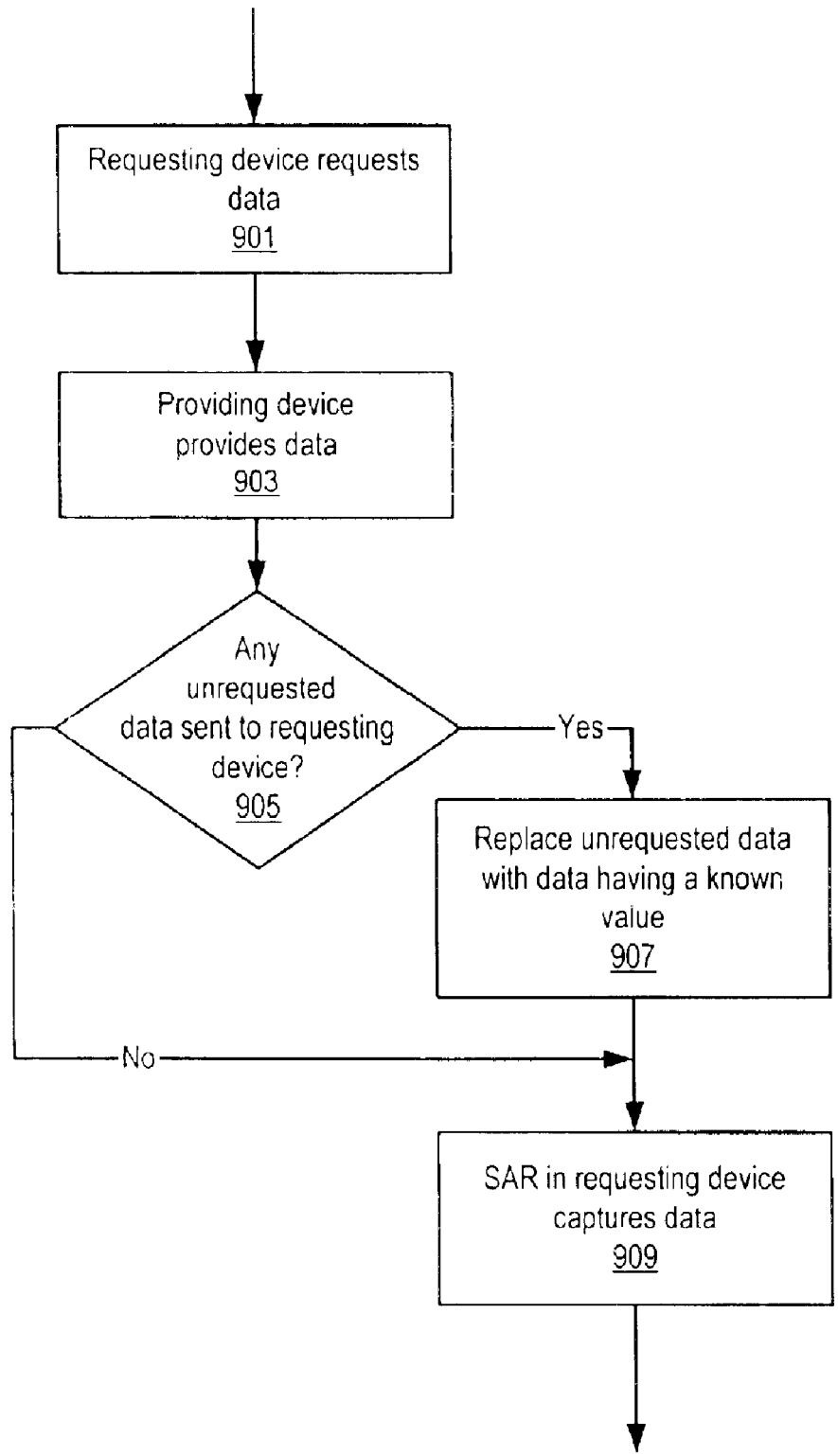
FIG. 9 is a flowchart illustrating one embodiment of a method of performing signature analysis.

Signature Analysis—FIGS. 8–9

In order to provide testing capabilities, some embodiments of a graphics system like the one shown in FIGS. 3–7 may include signature analysis hardware. The signal analysis hardware may include one or more signature analysis registers (SARs) that each store a signature as well as control hardware that controls how data and/or control signals are added to the existing signature(s) and allows capture to be started and stopped. Each SAR maybe initialized to a seed value or signature and, as data and/or control signals are captured, they may be combined with the seed value or signature to form a new signature. By comparing a calculated signature with a signature that is known to be correct for the same set of data, a pass/fail determination of the hardware under test may be made.

SARs may be arranged so that the signature in each may be used to verify a certain section of a graphics system. SARs may also be included at various locations within the graphics system (e.g., at the interface between the frame buffer 22 and the hardware accelerator 28 in order to capture data as it is provided to the frame buffer 22). As described above, data may be reordered and/or additionally processed as it flows through the graphics system, so the final signature stored in each SAR may differ from each of the other signatures for any given test. Furthermore, some tests may only target certain SARs.

SARs may be included at various interfaces in order to determine whether the data sent to a component is the same as the data received by the component. Many situations may arise where unpredictable data is passed between components in a graphics system. In order to prevent this unpredictable data from causing one or more of the signatures to become unpredictable during testing, the signature analysis hardware may also include a controller that replaces unpredictable data with a data of a known value. For example, if one component requests 32 bits of data from another component, the other component may respond by providing 64 bits of data (e.g., in accordance with the bus protocol of the data bus connecting the two components). The unrequested 32 bits may have unpredictable values that, if captured by the requesting device's SAR, would cause the resulting signature to be unpredictable. In order to cause the signature captured by the requesting component to be predictable, the unrequested bits may be replaced with bits having a known value before the data is captured by the signature analysis register.

FIG. 8 shows one embodiment of a graphics system that is configured to replace unrequested data with data having a known value so that captured signatures are predictable. In FIG. 8, two components are connected by a data bus 220. For example, the first component may be a component like the hardware accelerator 18 and the second component 252 may be a memory like texture buffer 20 or frame buffer 22. In another example, the first component may be a media processor 14 and the second component may be a hardware accelerator 18.

The first component 202 includes a data consumer 204 that is configured to generate requests for data from the second component 252. The first component 202 sends the requests for data to the second component. In this embodiment, the second component 252 includes a request queue 254 in which to buffer received requests. An indication of which data was requested in a given a request may be stored in a buffer 258. Buffer 258 may store multiple indications that identify the data requested by multiple pending requests in some embodiments. In such an embodiment, buffer 258 may be implemented as a FIFO (First In, First Out) queue. Each request is satisfied by data provider 264 outputting data onto bus 220 to the first component 202.

Data provider 264 may output more data than is requested in response to certain requests. For example, in accordance with a bus protocol for one embodiment of bus 220, each bus transaction may involve 128 bits (16 bytes) of data and a 16-bit byte mask indicating which bytes are valid (e.g., which bytes were requested by the data consumer). Each bit in the byte mask may indicate whether a corresponding byte is valid. The byte mask corresponding to a transaction may be stored in buffer 258 as requests are handled by the data provider 264.

When data provider 264 outputs requested data to bus 220, it passes through multiplexers 266, which may be controlled by the byte mask in buffer 258 that corresponds to the requested data. Multiplexers 266 select requested data (e.g., based on which bytes are indicated as being valid in the byte mask) to be output on bus 220. For example, in one embodiment, each multiplexer may be controlled by a bit in a byte mask that identifies whether a byte of data input to that multiplexer is valid or not for the current transaction.

The multiplexers 266 replace unrequested data (e.g., based on which bytes are indicated as being invalid in the byte mask) with data having a known value (as shown in FIG. 8, this value may be '0') and output the data having the known value onto bus 220. For example, if data provider 264 outputs 16 bits of data, 8 bits may be input to each multiplexer. If the byte mask for a particular transaction is '01' (e.g., indicating that the first 8 bits are invalid and the second 8 bits are valid), the leftmost multiplexer may output '00000000' and the rightmost multiplexer may output the 8 bits provided from data provider 264. Note that while two multiplexers 266 may be used in some embodiments, as shown in FIG. 8, other embodiments may include fewer or additional multiplexers. Furthermore, other embodiments may replace unrequested data with predictable data values other than zero. Additionally, indications other than byte masks may be used to identify which of the provided data was requested. In some embodiments, unrequested data may be replaced with data having a known value without using the specific hardware illustrated in FIG. 8.

In this embodiment, data output from multiplexers 266 is provided to a data queue 260, where it is buffered before being output onto bus 220. Note that in some embodiments, data may not be buffered in a queue 260 before being output to bus 220. Additionally, in some embodiments, data in a data queue 260 may be initialized to a predictable value (e.g., zero) in order to increase the likelihood that SAR 206 will capture predictable data.

The SAR 206 captures the data returned on bus 220 and combines this data with an existing signature to generate a new signature value. Since the unrequested data seen by the SAR 206 has a predictable value, the correct value of signature in SAR 206 is predictable. Thus, the correct signature may be determined by running the same test on a known working system or by simulation. The signature actually captured in SAR 206 may be compared to the known correct signature in order to determine whether the first component 202 received the correct data. If the signature is incorrect, it may indicate a failure of bus 220 or the second component 252. Note that in some embodiments, certain control signals may also be combined with the signature in SAR 206.

In some embodiments, the second component 252 may also include an SAR (not shown) in order to capture data before it is output on bus 220. This may allow erroneous components to be more easily detected. For example, if the signature in SAR 206 is incorrect and the signature captured internally to the second component is correct, it may indicate that the second component 252 is working correctly and that the bus 220 is malfunctioning. The SAR in the second component 252 may be coupled to capture the data being output to bus 220 after it has passed through multiplexers 266. In one embodiment, the signatures captured in the first component 202 and the second component 252 may be compared in order to determine whether data was correctly transmitted across the bus 220. Note that additional SARs may also be included (e.g., to capture control signals corresponding to the data transaction).

Figure 8A:
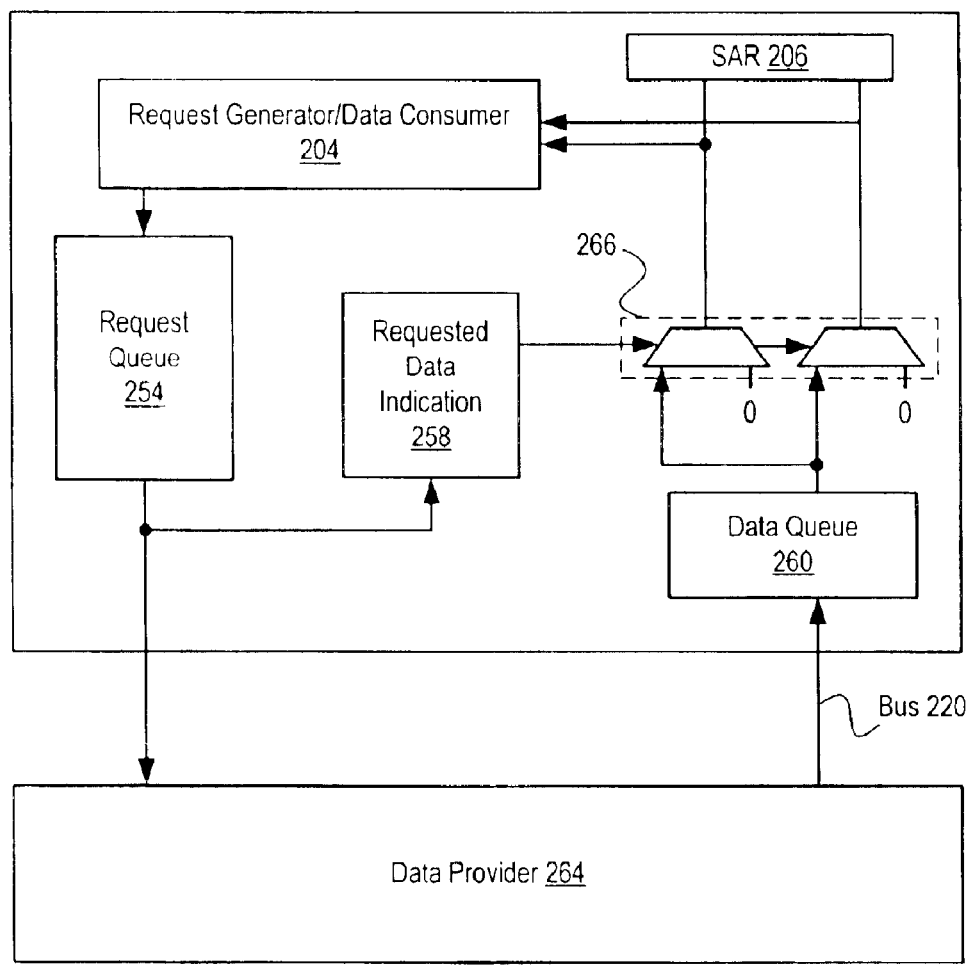
FIG. 8A shows a block diagram of another embodiment of a graphics system that includes a signature analysis register.

FIG. 8A shows an alternative embodiment of the system shown in FIG. 8. In this embodiment, the system to replace unpredictable data with predictable data is included in the first component 202. In this embodiment, the first component may queue requests being sent to the data provider 264 in request queue 254. As requests are sent to the data provider 264, an indication (e.g., a byte mask) identifying the data being requested may be stored in buffer 258. As above, buffer 258 may store indications for one or more requests. When data is returned on bus 220, it may be buffered in a data queue 260 (note that a data queue 260 may not be included in some embodiments). Data output from data queue 260 is output to the data consumer 204. As data is output from data queue 260, the indication identifying the requested data in buffer 258 may be used to control multiplexers 266, which replace unrequested data with data having a known value. Accordingly, the data seen by the SAR 206 is predictable.

Signature capture may be controlled by test software running on a host computer system 102. The test software may enable signature capture and compare the captured signature(s) to the expected signature(s) that a working system would generate. The control signatures may be generated by a known working system or by simulation. Before capture is enabled, the test software may set the value of the signature field to a "seed" value. The seed value(s) chosen for a particular test may correspond to the test image(s) being used with that test. Note that a different seed value may be stored in each SAR. In one embodiment, each SAR's seed value may be a zero value (e.g., input by resetting each SAR).

Each SAR may receive control signals (e.g., from a host computer system 102) that enable signature capture and/or that control how many cycles of data and/or control signals each SAR captures. In some embodiments, control signals provided to control each SAR may indicate a number of cycles that the SAR should delay before beginning capture. In one embodiment, the control signals that control each SAR may also affect the signatures of one or more of the SARs. Furthermore, reads to a particular SAR may also affect the signature stored in that SAR.

After capturing a signature, each SAR may continue to store the captured signature until its signature fields are cleared, a new seed value is written to its signature field, or capture is reinitiated. For example, in some embodiments, another capture may be requested using the previously captured signatures as the starting value (as opposed to storing a new seed value in each of the SARs) in order to capture more cycles of data and/or control signals than were requested in the previous capture.

Various algorithms may be used to combine each new data or control signal being captured to the signature. For example, one algorithm may involve XORing a captured bit with all or part of the preexisting signature. In another embodiment, the SARs may be implemented as LHCAs (linear hybrid cellular automatons). Generally, a cellular automaton is a discrete dynamical system where the signatures in the each register are updated according to a local rule. The registers may be updated at discrete time intervals. Each register's value may depend on what its value was in the previous time step. Additionally, each register's state may also depend on the signatures in its neighboring registers in the previous time step.

Signature calculation algorithms may be chosen so each set of test data and/or test control signals has a (nearly) unique signature. This way, there is little chance that a flawed system will produce the correct signature. In embodiments where the test sets are large, it may be useful to select an algorithm that is capable of capturing a large amount of data without creating repetitive signatures. As more data is captured, the amount of error detection may increase.

Different sets of test data and/or control signals may be designed that will each stress particular hardware. Depending on which of these tests pass and which fail, flawed hardware may be detected.

FIG. 9 shows one embodiment of a method of performing signature analysis. In this embodiment, a requesting device requests data at 901. A providing device provides data to the requesting device in response to the request, as indicated at 903. If the providing device is providing unrequested data to the requesting device (e.g., invalid data bytes identified by a byte mask corresponding to the data being provided), the unrequested data may be replaced with data having a known value (e.g., zero), as indicated at 905 and 907. The modified data may then be provided to the requesting device and captured by an SAR associated with the requesting device. Thus, the unrequested data, which may have an upredictable value that causes the signature captured in 909 to be unpredictable, is replaced with a predictable value that causes the signature captured at 909 to be predictable.

Note that while specific embodiments of a method and system for performing signature analysis have been described in the context of a graphics system, similar embodiments may be implemented in other computer systems. Numerous variations and modifications will become apparent to those skilled in the art once the above disclosure is fully appreciated. It is intended that the following claims be interpreted to embrace all such variations and modifications.

What is claimed is:

1. A computer system comprising:
a host computer system;
a first component configured to output data, wherein the data includes requested data and unrequested data;
a second component configured to request data from the first component, wherein the second component includes a signature analysis register configured to capture data, wherein the signature analysis register is configured to be controlled by the host computer system;
a bus coupling the first component and the second component and configured to transmit data between the first component and the second component;
a controller coupled to receive the data and the unrequested data output by the first component, wherein the controller is configured to receive the data output by the first component in response to the second component's request, wherein the controller is configured to replace the unrequested data with predictable data and to output the predictable data and the requested data, wherein the signature analysis register is configured to capture the predictable data and the requested data; and
wherein the controller is conflaured to store an indication identifying the reciuested data in response to the second component requesting data from the first component, wherein the controller is configured to select which of the data output by the first component is unrequested data dependent on the indication.

2. The computer system of claim 1, wherein the indication is a mask indicating which portions of the data are valid.

3. The computer system of claim 2, wherein the controller is configured to store a plurality of masks that each correspond to one of a plurality of pending requests for data from the first component.

4. The computer system of claim 2, wherein the controller includes one or more multiplexers, wherein each multiplexer's inputs include a predictable data value and a portion of the data output by the first component, wherein each multiplexer is controlled by a portion of the mask that corresponds to the portion of the data output by the first component.

5. The computer system of claim 1, wherein each bit included in the predictable data has a logical value of zero.

6. The computer system of claim 1, wherein the first component includes a data queue configured to buffer data before the data is output on the bus, wherein the controller is coupled to the output of the data queue, wherein the controller is configured to output the predictable data and the requested data on the bus.

7. The computer system of claim 1, wherein the second component further includes a second signature analysis register configured to capture control signals.

8. The computer system of claim 1, wherein the second component includes a data queue configured to buffer data after the data is received from the bus, wherein the controller is coupled to the input of the data queue, wherein the controller is configured to output the predictable data and the requested data to the data queue.

9. A graphics system comprising:
   a first component configured to output data, wherein the data includes requested data and unrequested data;
   a second component configured to request data from the first component, wherein the second component includes a signature analysis register configured to capture data;
   a bus coupling the first component and the second component and configured to transmit data between the first component and the second component;
   a controller coupled to receive the requested data and the unrequested data output by the first component, wherein the controller is configured to receive the data output by the first component in response to the second component's request, wherein the controller is configured to replace the unrequested data with predictable data and to output the predictable data and the requested data, wherein the signature analysis register is configured to capture the predictable data and the requested data; and
   wherein the controller is conflaured to store an indication identifying the requested data in response to the second component requesting data from the first component, wherein the controller is configured to select which of the data output by the first component is unrequested data dependent on the indication.

10. The graphics system of claim 9, wherein the first component includes a frame buffer and the second component includes a hardware accelerator.

11. The graphics system of claim 9, wherein the first component includes a media processor and the second component includes a hardware accelerator.

12. The graphics system of claim 9, wherein the indication is a mask indicating which portions of the data are valid.

13. The graphics system of claim 12, wherein the controller is configured to store a plurality of masks that each correspond to one of a plurality of pending requests for data from the first component.

14. The graphics system of claim 12, wherein the controller includes one or more multiplexers, wherein each multiplexer's inputs include a predictable data value and a portion of the data output by the first component, wherein each multiplexer is controlled by a portion of the mask that corresponds to the portion of the data output by the first component.

15. The graphics system of claim 9, wherein each bit included in the predictable data has a logical value of zero.

16. The graphics system of claim 9, wherein the first component includes a data queue configured to buffer data before the data is output on the bus, wherein the controller is coupled to the output of the data queue, wherein the controller is configured to output the predictable data and the requested data on the bus.

17. The graphics system of claim 9, wherein the second component further includes a second signature analysis register configured to capture control signals.

18. The graphics system of claim 9, wherein the second component includes a data queue configured to buffer data after the data is received from the bus, wherein the controller is coupled to the input of the data queue, wherein the controller is configured to output the predictable data and the requested data to the data queue.

19. A method of performing signature analysis, the method comprising:
   a requesting device requesting data;
   a providing device providing data in response to said requesting, wherein the data comprises requested data and unrequested data;
   replacing the unrequested data with predictable data, wherein the predictable data has a predictable value;
   a signature analysis register in the requesting device capturing the predictable data and the requested data; and
   storing, an indication identifying the requested data in response to said requesting device requesting data, wherein said replacing comprises selecting the unrequested data for replacement dependent on the indication.

20. The method of claim 19, wherein the indication is a mask indicating which portions of the data provided by the providing device are valid.

21. The method of claim 20, further comprising storing a plurality of masks that each correspond to one of a plurality of pending requests for data.

22. The method of claim 20, wherein said replacing comprises one or more multiplexers selecting a predictable data value to output if a portion of the mask that corresponds to a first portion of the data provided by the providing device indicates that the first portion of the data is not valid.

23. The method of claim 20, wherein said replacing comprises one or more multiplexers selecting a first portion of the data provided by the providing device to output if a portion of the mask that corresponds to the first portion of the data indicates that the first portion of the data is valid.

24. The method of claim 19, wherein each bit included in the predictable data has a logical value of zero.

25. The method of claim 19, further comprising buffering the data provided by the providing device in a data queue before the data is output on a bus, wherein said replacing comprises replacing the unrequested data output from the data queue and outputting the predictable data and the requested data on the bus.

26. A system for performing signature analysis, the system comprising:
   a means for requesting data;
   a means for providing data in response to said requesting, wherein the data comprises requested data and unrequested data;
   a means for replacing the unrequested data with predictable data, wherein the predictable data has a predictable value;
   a means for capturing the predictable data and the requested data in the means for requesting data; and
   a means for storing an indication identifying the requested data in response to said means for requesting data requesting data, wherein said replacing comprises selecting the unrequested data for replacement dependent on the indication.

* * * * *

UNITED STATES PATENT AND TRADEMARK OFFICE
CERTIFICATE OF CORRECTION

PATENT NO. : 6,873,330 B2
DATED : March 29, 2005
INVENTOR(S) : Burk et al.

It is certified that error appears in the above-identified patent and that said Letters Patent is hereby corrected as shown below:

Column 12,
Line 50, please delete "conflaured" and substitute -- configured --;
Line 51, please delete "reciuested" and substitute -- requested --.

Column 13,
Line 36, please delete "conflaured" and substitute -- configured --.

Signed and Sealed this

Fourteenth Day of June, 2005

JON W. DUDAS
*Director of the United States Patent and Trademark Office*